United States Patent [19]

Camp et al.

[11] 4,248,703
[45] Feb. 3, 1981

[54] EMULSION REMOVAL FROM ACIDIC SOLUTION-SOLVENT INTERFACES

[75] Inventors: Floyd E. Camp, Trafford, Pa.; Regis R. Stana, Lakeland, Fla.

[73] Assignee: Wyoming Mineral Corporation, Lakewood, Colo.

[21] Appl. No.: 34,310

[22] Filed: Apr. 30, 1979

[51] Int. Cl.³ .................. C01B 25/16; B01D 11/00
[52] U.S. Cl. ........................... 210/676; 210/634; 423/10; 423/321 R
[58] Field of Search ............... 210/21, DIG. 26, 22, 210/511, 24, 25, 30 R; 423/10, 321 R

[56] References Cited

U.S. PATENT DOCUMENTS

| | | | |
|---|---|---|---|
| 2,117,273 | 5/1938 | Brown | 210/24 R X |
| 2,859,092 | 11/1958 | Bailes et al. | 423/10 |
| 2,866,827 | 12/1958 | Jurgeleit et al. | 210/24 R X |
| 3,608,727 | 9/1971 | Grutsch et al. | 210/DIG. 26 X |
| 3,711,591 | 1/1973 | Hurst et al. | 423/10 |
| 4,087,512 | 5/1978 | Reese et al. | 423/321 R |

Primary Examiner—Frank A. Spear, Jr.
Attorney, Agent, or Firm—D. P. Cillo

[57] ABSTRACT

An emulsion, formed at the interface of an acidic solution and a solvent, is removed by passing at least one continuous belt through the emulsion by floating action, where portions of the emulsion attach to the surface of the belt material.

9 Claims, 3 Drawing Figures

EMULSION REMOVAL FROM ACIDIC SOLUTION-SOLVENT INTERFACES

BACKGROUND OF THE INVENTION

Commercially available wet process phosphoric acids are generally manufactured from either calcined or uncalcined phosphate rock. Calcining decomposes and drives off the organic matter in the rock, and the phosphoric acid product made by dissolving it, known as green acid, contains almost no suspended organic solids. When uncalcined rock is digested, considerable amounts of organic compounds are dissolved from the phosphate rock and remain as both soluble and insoluble impurities in the product acid, known as "black" or "brown" acid. These organic compounds in the acid are commonly referred to as humic acids or humic compounds.

The wet process phosphoric acid solution formed from uncalcined phosphate rocks generally contains about 600 grams/liter of $H_3PO_4$, about 0.2 gram/liter of uranium, about 1 gram/liter of calcium, about 9 grams/liter of iron, about 28 grams/liter of sulfate and about 30 grams/liter of fluorine, The phosphoric acid solution also contains varying amounts of arsenic, magnesium and aluminum, and substantial amounts of humic acid impurities.

Uranium and other metals can be recovered from this type of commercial grade wet process phosphoric acid. Such recovery processes, directed primarily to uranium, are taught by Bailes and Long, in U.S. Pat. No. 2,859,092, and by Hurst and Crouse, in U.S. Pat. No. 3,711,591.

To make the metal recovery process viable, however, it is necessary to control sludge emulsion formation at the acidic solution-solvent interface in the solvent extraction mixer-settlers used in the metal recovery process. This sludge problem, caused primarily by the humic acids, was recognized by Hurst and Crouse in U.S. Pat. No. 3,711,591.

Reese et al., in U.S. Pat. No. 4,087,512, attempted to solve problems of uranium extraction emulsions and sludge formation, caused by humic acids in the wet process phosphoric acid feed, by a purification pretreatment with a kerosine type hydrocarbon at between 55° C. to 70° C. Such a process, however, introduces considerable complexity into the uranium recovery process. Also, such an approach has not been found particularly effective in removing a major portion of the humic acid over an extensive time period.

Simpler mechanical removal methods, such as pumping at the interface, after allowing sludge emulsions to form, are not particularly effective because large quantities of expensive solvent are also pumped out. This pumping method is also hampered by the non-Newtonian flow properties of the sludge emulsion, which cause it to deviate from normal pipe entrance behavior.

What is needed is a process to remove substantially all of the sludge emulsions which form at the acid-solvent phase interface during solvent extraction in metal recovery processes. The process must remove a substantial amount of the sludge, must be low in capital cost, and should result in low operating costs.

SUMMARY OF THE INVENTION

A new and useful process has been discovered to inexpensively remove an emulsion at the interface of a separated composition comprising an acidic solution and solvent immiscible in the acidic solution.

The process involves passing a continuous belt of material, such as a rough string belt, through the emulsion interface between the acidic solution and the solvent medium. Portions of the emulsion formed at the interface will be attracted to and adhere to the string. The emulsion loaded string belt is drawn from the interface and passed through an emulsion removal means, such as an appropriately sized orifice or a set of rollers, with an associated catch trough. The emulsion is collected and the unloaded string belt is passed back into the acidic solution-solvent composition and back through the emulsion interface.

BRIEF DESCRIPTION OF THE DRAWINGS

For a better description of the invention, reference may be made to the preferred embodiments exemplary of the invention, shown in the accompanying drawings, in which.

DESCRIPTION OF THE PREFERRED EMBODIMENTS

Figure 1:
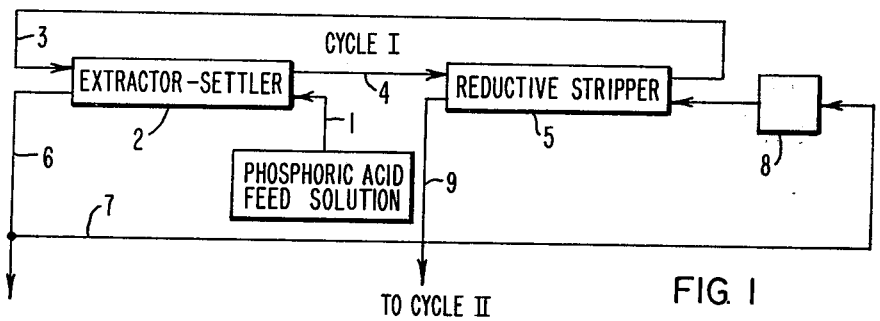
FIG. 1 is a flow diagram, illustrating one example of a prior art process for the stripping of uranium from a phosphoric acid feed, using an extraction mixer-settler.

Referring to FIG. 1 of the drawings, one method of extracting metal from an acidic solution is shown, more specifically, the process involves one type of process for the extraction of uranium from 30% $H_3PO_4$. In Cycle I, phosphoric feed acid from line 1 enters mixer-settler means 2, which may contain 1 to 5 stages. This feed is typically a 35° C. to 50° C. aqueous 5 M to 6 M solution of phosphoric acid having a pH of up to about 1.5 and containing about 0.5 to about 0.5 g/l of uranium (generally as the uranous ion, $U^{+4}$). In the process shown, the phosphoric acid may be oxidized before entering the mixer-settler by any suitable means, to ensure that the uranium is in the +6 oxidation state, i.e., uranyl ion.

In the mixer-settler, the feed acid is contacted by mixing with a water-immiscible, organic extractant solvent composition from line 3. The extractant solvent composition comprises a reagent, generally dissolved in a hydrocarbon diluent such as kerosine. The reagent extracts the uranyl ions to form a uranium complex soluble in the organic solvent. The solvent composition from line 3 can contain, for example, about 0.2 to 0.7 mole of a dialkyl phosphoric acid having from 4 to 12 carbon atoms in each chain, preferably di (2-ethylhexyl) phosphoric acid (D2EHPA-reagent) per liter of diluent. Other solvents that could be used in different uranium extraction processes would include octyl phenyl phosphoric acid and octyl pyro phosphoric acid alone or in combination in kerosine, among others. The solvent can also contain about 0.025 to about 0.25 mole of a synergistic reaction agent well known in the art, for example, a tri alkyl phosphine oxide, where the alkyl chains are linear having from 4 to 10 carbon atoms, preferably tri octyl phosphine oxide (TOPO) per liter of solvent. These synergistic agents allow reduction of equipment size while increasing uranium extraction.

In the solvent extraction step in the mixer-settler 2, if the aqueous phosphoric feed acid solution contains suspended solids, humic matter, or supersaturated salts, an emulsion will form at the interface between the solvent phase and the aqueous acidic phase. This emulsion consists of small drops about 0.005 inch to 0.015 inch in diameter, believed to comprise about 2 wt.% to 7 wt.% humic acid solids which form a membrane, trapping acid solution.

This emulsion is a severe process nuisance which hinders the normal operation of the mixer-settlers and ties up expensive D2EHPA-TOPO-kerosine solvent. Generally, sludge formation in the mixer-settler means 2, which may be a bank of up to 5 units, is from about 2 to 20 cu. ft./1,000 gallons of phosphoric feed acid solution.

The solvent composition, containing complexed uranium and contaminates, passes through line 4 to reductive stripper means 5, to strip uranium from the organic solvent. A portion of the raffinate from extractor 2 may be passed through lines 6 and 7 to reducer 8 and then on to the reductive stripper 5. The organic solvent leaving the stripper is then recycled through line 3 to extractor 2. Finally, the strip solution containing uranium ions may be oxidized and fed through line 9 into a Cycle II extraction process.

Figure 2:
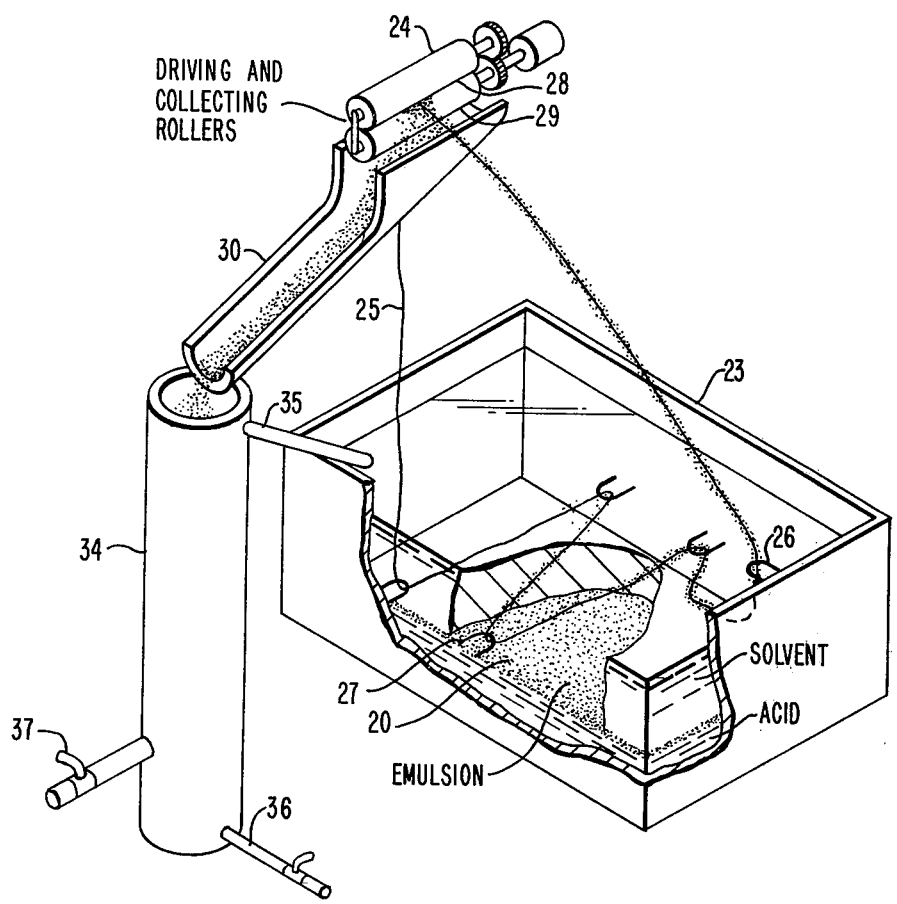
FIG. 2 shows an isometric view of a settler utilizing a first embodiment of the sludge emulsion removal method of this invention.
Figure 3:
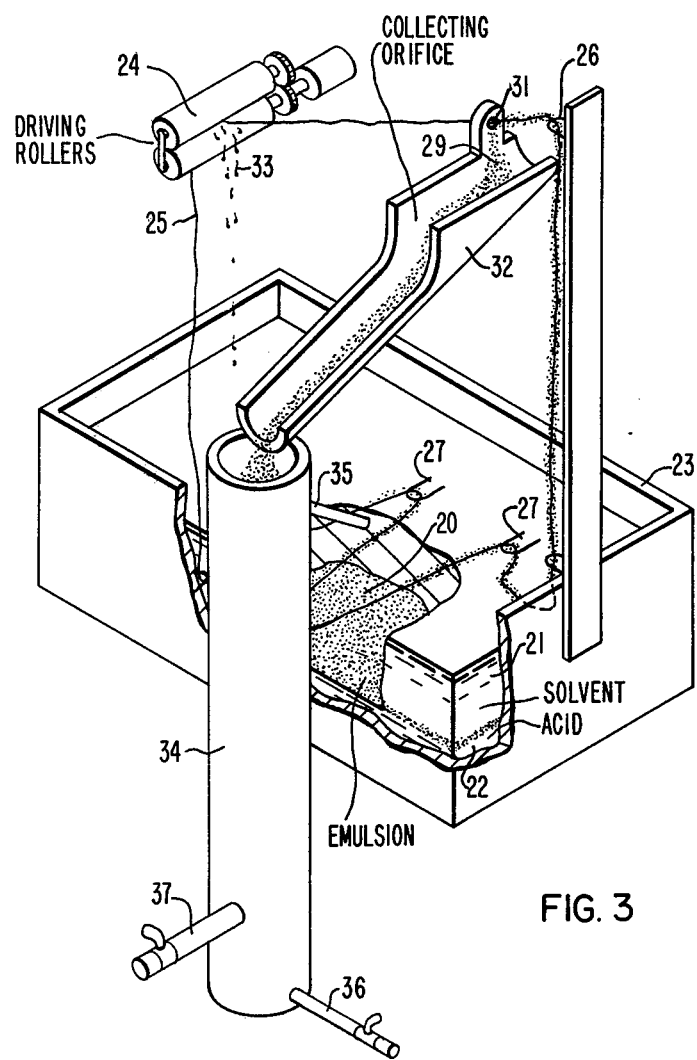
FIG. 3 shows an isometric view of a settler utilizing a second embodiment of the sludge emulsion removal method of this invention.

Referring now to FIGS. 2 and 3 of the drawings, the sludge emulsion phase is shown as 20. The emulsion 20, which is usually formed by interaction of metal extractant solvent with acidic solution, is shown at the phase interface between the metal extractant solvent 21 and the acidic solution 22 in the settler or mixer-settler tank 23, after the extractant solvent and acidic solution have been mixed together. Motor driven, gear meshed rollers 24, constructed preferably of a soft rubber that will not degrade easily in the solvent-acid environment can be used to move one or more continuous belts of material, such as a fibrous string, rope or flat tape 25, having a density between that of the acid and the solvent, through the interface sludge emulsion 20 in the settler. If more than one belt is used, steps must be taken to insure that they will not tangle with each other.

A guide means 26, some distance from the rollers can be used to assure that the string 25 does not run off the edge of the rollers, and to prevent any tangles from running through the rollers. This guide should not scrape any substantial amount of collected emulsion from the string. Any emulsion that is removed at this point can be collected by a suitable trough or other means positioned under the guide. Back and forth, side to side, generally horizontal snaking action of the string, shown in FIGS. 2 and 3, is insured by the floating action of the string and by allowing an excess length to float at the interface. This snaking action at the interface can be improved by positioning a plurality of movable guide means 27 at the interface.

If guides are used they must be very loose to prevent excessive scraping of the emulsion from the string. The back and forth, horizontal snaking action of the string assures maximum sludge loading on the string. The continuous string thus enters the mixer-settler and passes through the interface emulsion, continuously attracting and picking up sludge on its surface and absorbing it. The loaded string then exits the mixer-settler and is drawn and guided toward the sludge removal means.

In FIG. 2, the sludge removal means 28 comprise the driving rollers, which squeeze the sludge loaded string, removing sludge emulsion 29 which is caught in a catch trough 30 underneath the rollers. In another embodiment of the settler apparatus, shown in FIG. 3, the sludge is scraped off the sludge loaded string by passing it through an appropriately sized orifice sludge removal means 31, effective to remove the sludge, where the string runs in a downward slope as shown. In this manner, the sludge will not run back into the settler via the string off the orifice. The sludge emulsion 29 is caught in a catch trough 32 underneath the orifice 31. In FIG. 3 the rollers 24 are utilized as a driving mechanism, and to squeeze out excess solvent and acid 33 from within the string allowing the solvent and acid to fall into the mixer-settler 23. This method provides a richer fraction of sludge emulsion since the orifice removes mostly sludge rather than solvent and acid.

The sludge emulsion 29, in both embodiments can be collected by gravity flow into a settling vessel 34, where solvent overflows at outlet 35 into the mixer-settler 23, and acidic solution is recycled from outlet 36 at the bottom of the settling vessel. The sludge emulsion is removed from the mid-portion via outlet 37. In both embodiments, the height of the sludge removal means should be at least about 6 inches from the composition surface. In the embodiment shown in FIG. 2, the angle at 26 should be between about 30° to 45° for best results. At a given string speed, the amount of solvent and acid flowing back downward along the sludge loaded string into the mixer-settler increases with additional height to a certain equilibrium point where this flowback also carries sludge with it into the mixer-settler. The preferred string speed is between about 25 to 180 inches/minute.

The belt is preferably of fibrous material such as jute, although other fibrous materials, generally in twisted form, such as hemp and cotton, and synthetics, such as polyester and the like can be used. The belt material must be effective to cause emulsion to attach to its surface. The belt material is preferably porous and rough or abraded, having protruding filaments, which generally provide a wicking action in order to more easily attract and hold the sludge. Materials with chemically smoothed finishes will not be particularly effective. The belt material must have a specific gravity between the solvent and acid used, generally between about 0.8 (the sp.gr. of most solvents used in metal extraction) and about 1.3 (the sp.gr. of 30% phosphoric acid), otherwise it will not exhibit the necessary floating action in the emulsion phase. The belt dimensions should be at least ⅛ inch in thickness or diameter, to insure adequate sludge pickup.

EXAMPLE

Approximately 2 liters of commercial grade wet process, aqueous, phosphoric acid solution (30% $P_2O_5$; sp.gr.=1.36), containing humic acid solids and supersaturated salts, and about 0.2 gram/liter of uranium along with various impurities, 2 liters of a water-immiscible, organic, uranium metal extractant solvent, comprising a 4:1 mole ratio mixture of di(2-ethylhexyl) phosphoric acid: trioctylphosphine oxide (sp.gr. about 0.8) diluted in kerosine, and about 400 ml. of pre-formed sludge emulsion were poured into a settler tank having a bottom and interface area of 110 square inches.

After standing, interacting and separating for 8 hours, an emulsion phase formed between a top solvent phase and a bottom acidic solution phase. The emulsion phase constituted about 10 vol.% of the three phase composition. The sludge addition was to insure a large vol.% for removal. The settler apparatus comprised the settler tank and the roller drive and belt squeeze mechanism shown in FIG. 2 of the drawings. The belt material consisted of one continuous 44 inch piece of round, rough, twisted jute string, having protruding filaments. The string was about 0.25 inch in diameter, and had a specific gravity of about 1.0.

The fibrous jute string was passed through the composition and emulsion phase at a speed of 130 inches/minute at a driving roller height of 7.5 inches from the top of the composition. The length of jute was such as to allow a floating, snaking action through the emulsion phase at the acid-solvent interface. A collecting pan which was disposed below the squeeze rollers, as shown in FIG. 2, allowed acid-solvent and emulsion collection in a settling vessel.

After standing for 8 hours, the collected composition consisted of 25 vol.% sludge emulsion, demonstrating the effectiveness of this method in removing sludge from a simulated metal recovery extractor-settler.

As a variation of the above-described method, a settler apparatus similar to that shown in FIG. 3 of the drawings was used, with the same quantity of acidic solution, solvent and emulsion as described above. The settler tank in this case had a bottom and interface area of 92 square inches. The 44 inch long fibrous 0.25 inch diameter jute string was passed through the composition and emulsion phase and the orifice at a speed of 32 inches/minute. The orifice was about 0.3 to 0.4 inch in diameter, and was 21 inches above the top of the composition. The jute string ran in a downward slope through the orifice which collected mostly emulsion.

A collecting pan which was disposed below the orifice as shown in FIG. 2, allowed emulsion collection in a settling vessel. The jute string then passed to the rollers which squeezed acidic solution-solvent from the string into the settler vessel. After 8 hours the collected composition consisted of 36 vol.% sludge emulsion. Both types of settler apparatus described above would be very effective in removing sludge emulsions formed at acidic solution-solvent interfaces in settlers or extractor settlers in metal recovery or other type processes.

We claim:

1. A process for removing emulsions at the interface of an acidic solution and a solvent immiscible in the acid solution, comprising the steps of:

(A) providing a separated composition comprising an acidic solution phase, solvent phase, and an emulsion phase disposed therebetween at the acidic solution-solvent phase interface, (B) passing at least one continuous string belt of fibrous material, having a specific gravity between that of the acidic solution and the solvent, into the composition, and then passing it by floating action through the emulsion phase, where portions of the emulsion attach to the surface of the belt material, (C) passing the continuous string belt containing attached, loaded emulsion out of the composition, (D) removing emulsion from the surface of the string belt in a manner effective to prevent return of the emulsion back into the composition, and (E) collecting the removed emulsion.

2. The method of claim 1, wherein the belt material is effective to cause the emulsion to attach to its surface.

3. The method of claim 1, wherein the solvent is a metal extractant solvent and the belt is a rough porous material having protruding filaments providing wicking action and a specific gravity of between about 0.8 and 1.3.

4. The method of claim 1, wherein the belt material moves through the emulsion by a snaking action.

5. The method of claim 1, wherein the solvent comprises a reagent selected from the group consisting of dialkyl phosphoric acid having from 4 to 12 carbon atoms, octyl phenyl phosphoric acid, oxtyl pyro phosphoric acid, and mixtures thereof, and tri octyl phosphine oxide reaction agent, and the acidic solution consists essentially of wet process, aqueous phosphoric acid.

6. The method of claim 1, wherein the solvent comprises a mixture of dialkyl phosphoric acid and tri octyl phosphine oxide and the acidic solution consists essentially of wet process, aqueous phosphoric acid.

7. The method of claim 1, wherein the belt is a material selected from the group consisting of jute, hemp, polyester and cotton.

8. The method of claim 1, wherein the emulsion is removed from the belt material by passing the emulsion loaded belt through a set of rollers effective to remove emulsion.

9. The method of claim 1, wherein the emulsion is removed from the belt material by passing the emulsion loaded belt through an appropriately sized orifice effective to remove emulsion.

* * * * *